United States Patent
Chang et al.

(10) Patent No.: US 10,940,623 B1
(45) Date of Patent: Mar. 9, 2021

(54) MOLDING SYSTEM FOR PREPARING MOLDING ARTICLE

(71) Applicant: CORETECH SYSTEM CO., LTD., Chupei (TW)

(72) Inventors: Yuan-Jung Chang, Chupei (TW); Rong-Yeu Chang, Chupei (TW); Chen-Chieh Wang, Chupei (TW); Chia-Hsiang Hsu, Chupei (TW)

(73) Assignee: Coretech System Co., Ltd., Chupei (TW)

( * ) Notice: Subject to any disclaimer, the term of this patent is extended or adjusted under 35 U.S.C. 154(b) by 0 days.

(21) Appl. No.: 17/033,114

(22) Filed: Sep. 25, 2020

Related U.S. Application Data

(60) Provisional application No. 62/960,206, filed on Jan. 13, 2020, provisional application No. 62/960,201, filed on Jan. 13, 2020.

(51) Int. Cl.
  *B29C 45/77*    (2006.01)
  *G06F 30/28*    (2020.01)
  *B29C 45/00*    (2006.01)

(52) U.S. Cl.
  CPC .......... *B29C 45/77* (2013.01); *B29C 45/0046* (2013.01); *G06F 30/28* (2020.01); *B29C 2945/76859* (2013.01)

(58) Field of Classification Search
  CPC ...... B29C 45/77; B29C 45/0046; G06F 30/28
  See application file for complete search history.

(56) References Cited

U.S. PATENT DOCUMENTS

2016/0332342 A1*  11/2016  Pillwein ................. B29C 45/76

OTHER PUBLICATIONS

1. J. P., Lesbats, R. Legros, and J. V. Aleman, "Longitudinal volume viscosity of epoxide prepolymers," Journal of Polymer Science: Polymer Chemistry Edition, vol. 20, No. 8, pp. 1971-1984, 1982.
2. J. V., Aleman, "Elongational, shear and volume viscosities of polymer melts," Rheologica acta, vol. 27, No. 1,pp. 61-68,1988.
3. P. Chivapornthip, and E. L. J. Bohez, "Dependence of bulk viscosity of polypropylene on strain, strain rate, and melt temperature," Polymer Engineering & Science vol. 57, No. 8, pp. 830-837, 2016.

* cited by examiner

*Primary Examiner* — James Sanders
(74) *Attorney, Agent, or Firm* — Muncy, Geissler, Olds & Lowe, PC

(57) ABSTRACT

The present disclosure provides a molding system for preparing molding articles. The molding system includes a molding machine; a mold disposed on the molding machine and having a mold cavity for being filled with a molding resin; a processing module configured to generate a mechanical pressure distribution of the molding resin in the mold cavity based on a molding condition for the molding machine, wherein the mechanical pressure distribution of the molding resin is generated based in part on a bulk viscosity effect of the molding resin; and a controller operably communicating with the processing module and configured to operate the molding machine for transferring the fluid molding material into the mold cavity with the molding condition using the generated pressure distribution of the molding resin to perform an actual molding process for preparing the molding article.

8 Claims, 9 Drawing Sheets

MOLDING SYSTEM FOR PREPARING MOLDING ARTICLE

CROSS-REFERENCE TO RELATED APPLICATION

This patent application claims priority under 35 U.S.C. § 119(e) from Provisional Patent Application No. 62/960,201, and 62/960,206 both filed on Jan. 13, 2020, the disclosures of which are incorporated by reference herein in its entirety, including all exhibits appended to Provisional Patent Application No. 62/960,201 and 62/960,206.

TECHNICAL FIELD

The present disclosure relates to a molding system for preparing a molding article, and more particularly, to a molding system for preparing a molding article using a computer-aided engineering (CAE) simulation.

DISCUSSION OF THE BACKGROUND

Injection molding is a technology commonly used for high-volume manufacturing of parts made of synthetic resin, most commonly made of thermoplastic polymers. During a repetitive injection molding process, a plastic resin, most often in the form of small beads or pellets, is introduced to an injection molding machine that melts the resin beads under heat, pressure, and shear. The resulting molten resin is forcefully injected into a mold cavity having a particular cavity shape. The injected plastic is held under pressure in the mold cavity, cooled, and then removed as a solidified part having a shape that essentially duplicates the cavity shape of the mold.

A typical injection molding procedure comprises four basic operations: (1) heating the plastic in the injection molding machine to allow it to flow under pressure; (2) injecting the melted plastic into a mold cavity or cavities defined between two mold halves that have been closed; (3) allowing the plastic to cool and harden in the cavity or cavities while under pressure; and (4) opening the mold halves to cause the part to be ejected from the mold. In the conventional injection molding of synthetic resin by an injection molding machine, the weight of the injected synthetic resin varies with the molten resin pressure, the molten resin specific volume, the molten resin temperature or other molten resin conditions. Therefore, it is difficult to form products of a consistent quality.

In general, the setting of molding conditions of the injection molding machine requires a large number of trial molding operations and a long setting time because the setting work greatly depends on the know-how and experience of an operator of the injection molding machine, and various physical values affect one another as well.

Therefore, a virtual molding process, i.e., computer-implemented simulation, using CAE (Computer-Assisted Engineering), is performed for the injection molding, and the molding conditions are then set based on the virtual molding. In virtual molding using CAE, phenomena will occur in a mold cavity within a short period of time. That is, the effects of resin temperature, pressure, shear rate, etc. on molded products can be simulated using CAE. Therefore, if the molding phenomena occurring within a mold cavity can be known accurately, using CAE may enable optimization of molding conditions and a stable molding of non-defective products.

In plastics manufacturing, the actual flow of polymer melts is transient, non-Newtonian and non-isothermal, with frozen layers building up as the complex mixture flows through the mold cavity. Characteristics of a finished product are determined by many complex factors, such as changes in the direction of flow, inclusion of ribs, and changes in thickness and holes. To control the quality of the products, a deep understanding of complicated flow fields is critical. Nowadays, CAE (computer-aided engineering) software provides realistic simulation and predictive analysis for complex flows of complex fluids.

The role of bulk viscosity or volume viscosity has been neglected for several decades in the molding flow analysis. This is because the flow of molten plastic in the filling stage is virtually divergence free. Despite the compressional and non-divergence free flow in the packing-holding stage, still the bulk viscosity has been ignored.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

One aspect of the present disclosure provides a molding system for preparing a molding article. The molding system comprises: a molding machine; a mold disposed on the molding machine and having a mold cavity for being filled with a molding resin; a processing module configured to generate a mechanical pressure distribution of the molding resin in the mold cavity based on a molding condition for the molding machine, wherein the mechanical pressure distribution of the molding resin is generated based in part on a bulk viscosity effect of the molding resin; and a controller operably communicating with the processing module and configured to operate the molding machine for transferring the fluid molding material into the mold cavity with the molding condition using the generated pressure distribution of the molding resin to perform an actual molding process for preparing the molding article.

In some embodiments, the mechanical pressure distribution of the molding resin is generated based in part on the bulk viscosity effect to a volume variation of the molding resin.

In some embodiments, the mechanical pressure distribution of the molding resin to a volume variation of the molding resin is represented using an expression:

$$\rho \frac{Du}{Dt} = -\nabla \sigma + \nabla \left( \left( -\frac{2}{3}\eta \right)(\nabla \cdot u) \right) + \nabla \cdot (\eta(\nabla u + \nabla u^T))$$

where ρ represents a density of the molding resin, u represents velocity, σ represents the mechanical pressure of the molding resin, η represents the viscosity of the molding resin, and ∇·u represents the volume variation of the molding resin.

In some embodiments, the mechanical pressure distribution of the molding resin is generated based in part on the bulk viscosity effect to a pressure difference between a mechanical pressure and an equilibrium pressure of the molding resin.

In some embodiments, the bulk viscosity effect to a pressure difference between a mechanical pressure and an equilibrium pressure of the molding resin is represented using an expression:

$$\nabla \cdot \rho u = -\frac{\partial \rho}{\partial t} = -\left(\frac{\partial \rho}{\partial T}\right)_p \frac{\partial T}{\partial t} - \left(\frac{\partial \rho}{\partial p}\right)_T \frac{\partial}{\partial t}(\sigma + \mu_d(\nabla \cdot u))$$

where $\rho$ represents a density of the molding resin, u represents a velocity of the molding resin, $\mu_d$ represents the bulk viscosity, $\sigma$ represents the mechanical pressure of the molding resin, and $\mu_d(\nabla \cdot u)$ represents the pressure difference.

In some embodiments, the bulk viscosity of the molding resin is represented using an expression:

$$\mu_d = \frac{\mu_0}{1 + \left(\frac{\mu_0(|\nabla \cdot u|)}{\tau^*}\right)^{1-n}}$$

$$\mu_0 = D_1 a^*$$

$$a^* = \begin{cases} \exp\left(\frac{-A_1(T - T^*)}{A_2 + (T - T^*)}\right), \text{ for } T \geq T^* \\ \exp\left(\frac{\Delta H_T}{R}\left(\frac{1}{T} - \frac{1}{T^*}\right)\right), \text{ for } T < T^* \end{cases}$$

$$T^* = D_2 + D_3\sigma$$

$$A_2 = \tilde{A}_2 + D_3\sigma$$

where T* represents a solidifying temperature of the molding resin, $\nabla \cdot u$ represents a rate of volume change, $\mu_0$ represents a bulk viscosity at a zero rate of volume change, and $\tau^*$ represents a characteristic stress related to the volumetric stress at a transition between a first flowing state and a second flowing state of the molding resin, n represents a power-law index of the first flowing state of the molding resin, and a* represents a time-temperature shift factor including mechanical pressure effect.

In some embodiments, the mechanical pressure distribution of the molding resin to a volume variation of the molding resin is represented using an expression:

$$\rho \frac{Du}{Dt} = -\nabla \sigma + \nabla \cdot (\eta(\nabla u + \nabla u^T))$$

where $\rho$ represents a density of the molding resin, u represents velocity, $\sigma$ represents the mechanical pressure of the molding resin, $\eta$ represents the viscosity of the molding resin, and $\nabla \cdot u$ represents the volume variation of the molding resin.

In some embodiments, the bulk viscosity effect to a pressure difference between a mechanical pressure and an equilibrium pressure of the molding resin is represented using an expression:

$$\nabla \cdot \rho u = -\frac{\partial \rho}{\partial t} = -\left(\frac{\partial \rho}{\partial T}\right)_p \frac{\partial T}{\partial t} - \left(\frac{\partial \rho}{\partial p}\right)_T \frac{\partial}{\partial t}\left(\sigma + \left(\mu_d - \frac{2}{3}\eta\right)(\nabla \cdot u)\right)$$

where $\rho$ represents a density of the molding resin, u represents a velocity of the molding resin, $\mu_d$ represents the bulk viscosity, $\sigma$ represents the mechanical pressure of the molding resin, and $$\left(\mu_d - \frac{2}{3}\eta\right)(\nabla \cdot u)$$

represents the pressure difference.

In some embodiments, the bulk viscosity of the molding resin is represented using an expression:

$$\mu_d = \frac{\mu_0}{1 + \left(\frac{\mu_0(|\nabla \cdot u|)}{\tau^*}\right)^{1-n}}$$

$$\mu_0 = D_1 a^*$$

$$a^* = \begin{cases} \exp\left(\frac{-A_1(T - T^*)}{A_2 + (T - T^*)}\right), \text{ for } T \geq T^* \\ \exp\left(\frac{\Delta H_T}{R}\left(\frac{1}{T} - \frac{1}{T^*}\right)\right), \text{ for } T < T^* \end{cases}$$

$$T^* = D_2 + D_3\sigma$$

$$A_2 = \tilde{A}_2 + D_3\sigma$$

where T* represents a solidifying temperature of the molding resin, $\nabla \cdot u$ represents a rate of volume change, $\rho_0$ represents a bulk viscosity at a zero rate of volume change, and $\tau^*$ represents a characteristic stress related to the volumetric stress at a transition between a first flowing state and a second flowing state of the molding resin, n represents a power-law index of the first flowing state of the molding resin, and a* represents a time-temperature shift factor including mechanical pressure effect.

In some embodiments, the hulk viscosity effect functions as a resistance preventing the molding resin from changing its size. When the temperature of the molding resin decreases, the molding resin shrinks correspondingly. However, the resistance of the bulk viscosity effect prevents the molding resin from changing its size quickly; consequently, in practice, the molding resin shrinks more slowly due to the bulk viscosity effect. As shown in FIGS. 7-9, the present disclosure can correctly simulate the pressure variation of the molding resin in the mold cavity during the packing phase of the molding process; therefore, the present disclosure can be used to accurately simulate the molding process to generate a molding condition to perform an actual molding process for preparing the molding article with the designed size.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a molding system for preparing a molding article using a computer-aided engineering (CAE) simulation. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily.

Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
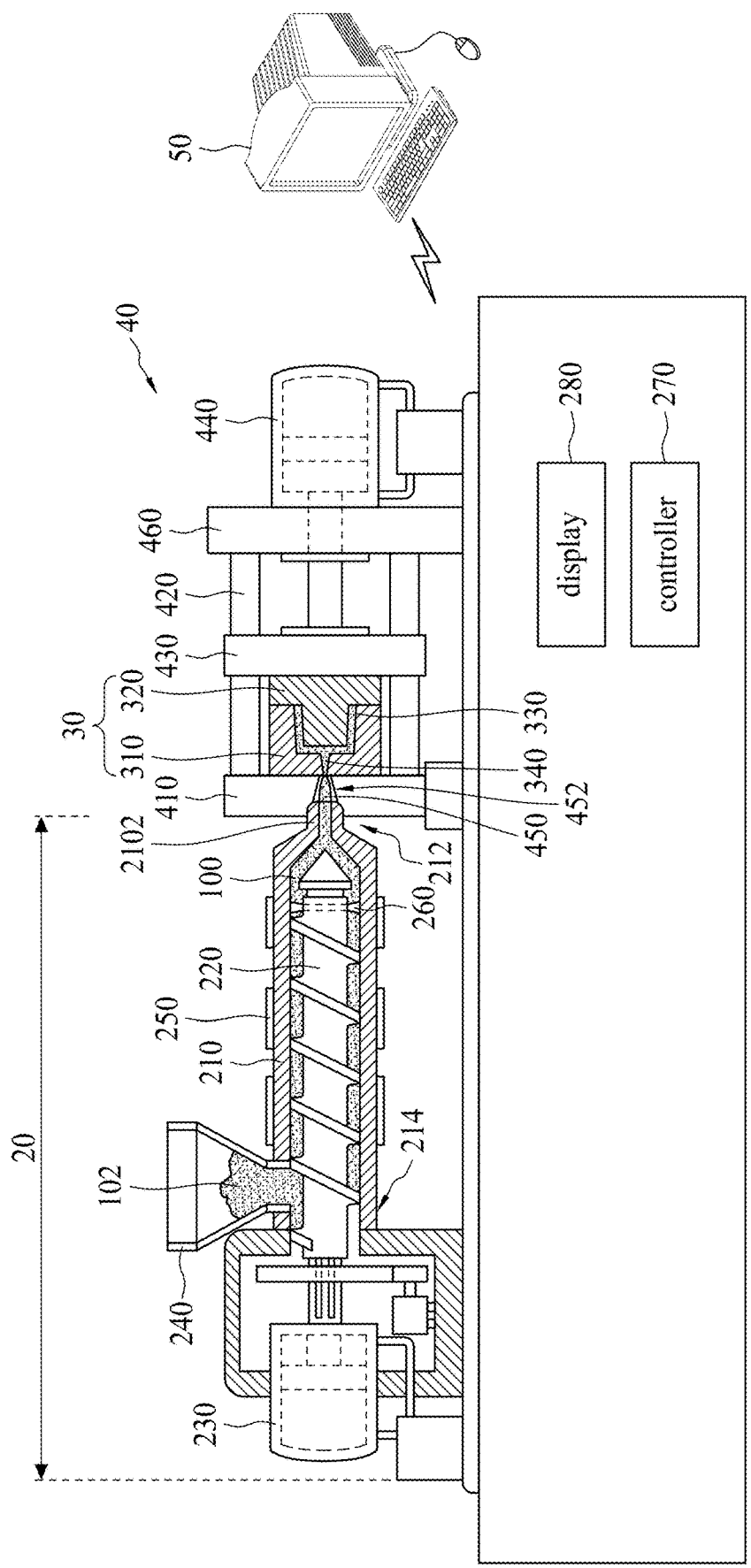
FIG. 1 is a schematic view of an injection-molding apparatus in accordance with some embodiments of the present disclosure.

FIG. 1 is a schematic view of an injection-molding apparatus 10 in accordance with some embodiments of the present disclosure. Referring to FIG. 1, the injection-molding apparatus 10 that can be used to carry out molding includes a molding machine 20, a mold 30, a clamping assembly 40 and a computer 50. The molding machine 20 includes a barrel 210 having a downstream end 212 connected to the mold 30. The mold 30 includes mold halves 310 and 320 to define a mold cavity 330 and a runner 340 in communication with the mold cavity 330.

The clamping assembly 40 is in operative connection with the mold 30 for clamping the mold halves 310 and 320. In some embodiments, the clamping assembly 40 includes a fixed plate 410, a plurality of tie bars 420 mounted on the fixed plate 410, and a moving plate 430 slidably engaged with the tie bars 420 and guided by a driving cylinder 440. The mold half 310 proximal to the barrel 210 is secured on the fixed plate 410, and the mold half 320 distal to the barrel 210 is secured on the moving plate 430 in any suitable manner, wherein the driving cylinder 440 drives the moving plate 430 to open or close the mold 30. In some embodiments, the barrel 210 includes a nozzle 2102 adapted to engage a sprue 450 in the fixed plate 410. In some embodiments, the sprue 450 is in communication with the runner 340 as the mold half 310 is assembled with the fixed plate 410. In some embodiments, the fixed plate 410 may be equipped with a sprue bushing 452 including the sprue 450 and receiving the nozzle 2102 during an injection time. A molding material 100 under pressure is delivered to the sprue bush 452 from the nozzle 2102 pressed tightly against the sprue bush 452 in order to deliver the molding material 100 to the sprue 450 during a filling stage of the injection time.

In some embodiments, the clamping assembly 40 further includes an ejector plate 460 mounted with at least one ejector pin (not shown), wherein the moving plate 430 is disposed between the fixed plate 410 and the ejector plate 460. In some embodiments, the ejector plate 460 is fixed on one of the plurality of tie bars 420. In some embodiments, the driving cylinder 440 penetrates the ejector plate 460 and directly connects to the moving plate 430 to open or close the mold 30. After the mold halves 310 and 320 are separated (i.e., the mold 30 is opened), a distance between the moving plate 430 and the ejector plate 460 is reduced, so the ejector pin can penetrate through the ejector plate 460 to push a molded product out of the mold 30.

A screw 220 is mounted for moving within the barrel and is operably connected, at an upstream end 214 opposite to the downstream end 212 of the barrel 210, to a driving motor 230. The molding machine 20 processes material, such as plastic granules 102, by feeding the material through a hopper 240 to the barrel 210 in order to make the material soft and force the molding material 100 into the mold 30 by the use of the screw 220, wherein the phase of the plastic granules 102 is changed from solid to liquid by at least one heater band 250 surrounding the barrel 210. In some embodiments, the molding machine 20 further includes a check valve 260 mounted on the screw 220, wherein the check valve 260 is in tight contact with the barrel 210 during the filling stage, and the check valve 260 is open for allowing the liquid material to flow to the downstream end 212 of the barrel 210 during a packing stage. In some embodiments, if the mold cavity 330 is almost filled with the molding material 100, a packing process proceeds. In some embodiments, the screw 220 rotates and moves toward the upstream end 214 of the barrel 210 during the packing stage.

The injection-molding apparatus 10 further includes a controller 270 for controlling and monitoring the real-time functions of the molding machine 20, and a display 280 for displaying data related to the performance and operation of the molding machine 20 to on-site technicians. In some embodiments, the display 280 is further configured to accept input data from the on-site technicians. In other words, the display 280 is provided with a communications link directly with the controller 270 to provide real-time control of the molding machine 20 by the on-site technicians particularly where the on-site technicians' intervention is required.

In some embodiments, the injection-molding apparatus 10 can further include operation interface communication links among the controller 270, the display 280 and peripheral devices, and a program sequence of operation which allows the operation interface to monitor diagnostic functions of the controller 270 and the molding machine 20, trigger sound and/or light alarms regarding conditions of the molding machine 20, receive performance data from the molding machine 20, and receive input data from the display 280.

The computer 50 is associated with the molding machine 20 and is configured to execute CAE simulation software and transmit at least one simulation result to the controller 270 through a connection such as a hard wire connection or a wireless coupling. In some embodiments, the computer 50 includes a standardized operation system capable of running general-purpose application software for assisting with the analysis of process performance data and for communicating with the controller 270 and the display 280 via communication ports of each.

Figure 2:
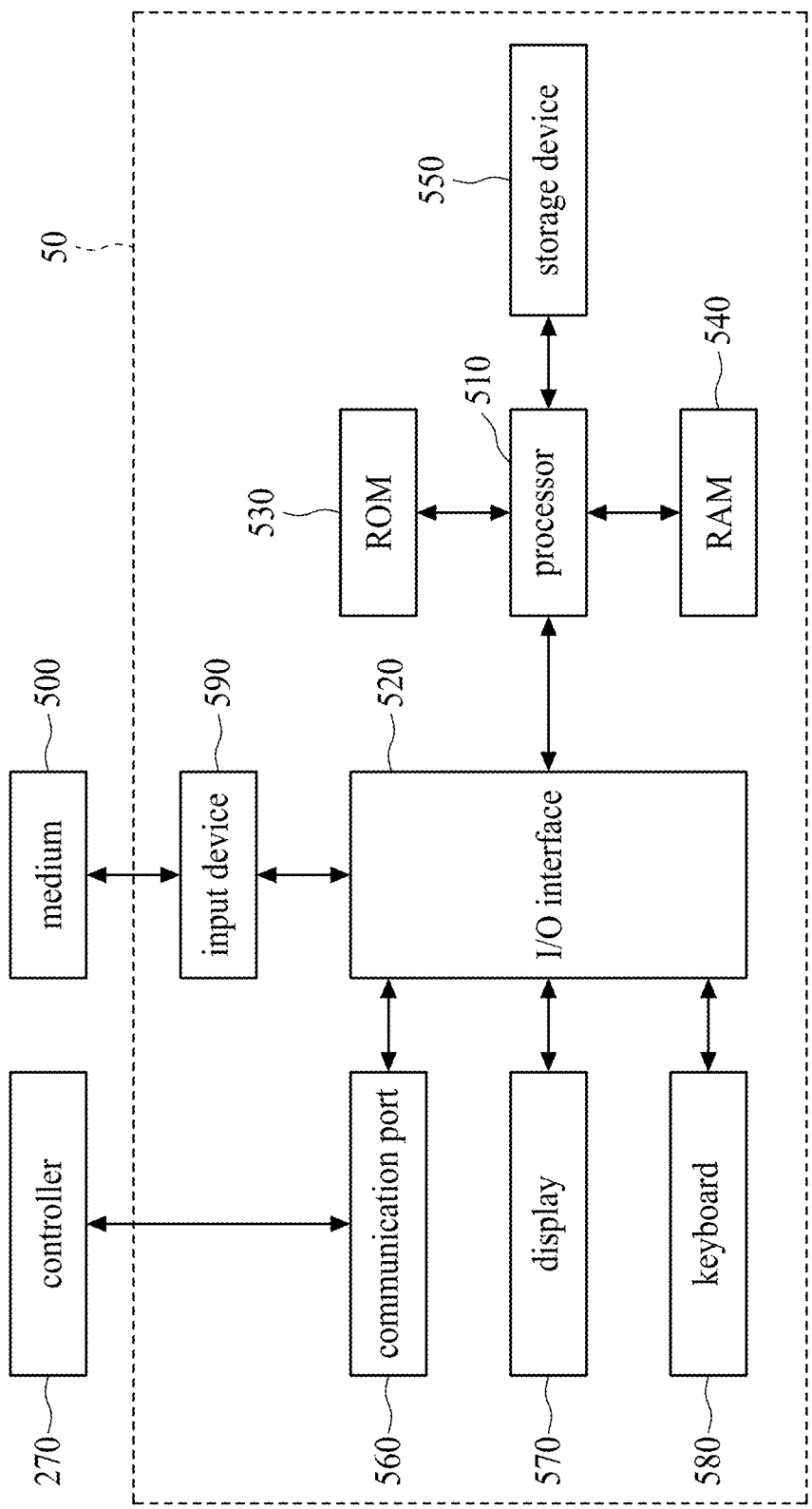
FIG. 2 is a functional block diagram of the computer in FIG. 1.

FIG. 2 is a functional block diagram of the computer 50 in FIG. 1. Referring to FIG. 2, the computer 50 includes a processing module 510 such as a processor adapted to perform a computer-implemented simulation method for use in molding process such as injection mold and compress molding, an input/output (I/O) interface 520 electrically coupled to the processing module 510, and memories, which may include a read-only memory (ROM) 530, a random access memory (RAM) 540 and a storage device 550. The ROM 530, the RAM 540 and the storage device 550 are communicatively coupled to the processing module 510.

The computer 50 further includes a communication port 560 associated with the controller 270 of the molding machine 20. The computer 50 may further include one or more accompanying input/output devices including a display 570, a keyboard 580 and one or more other input devices 590. The input devices 590 may include a card reader, an optical disk drive or any other device that allows the computer 50 to receive input from the on-site technicians. In some embodiments, the input devices 590 are configured to input computer instructions (software algorithms) stored in a non-transitory computer-readable medium 500, and the processing module 510 is configured to execute operations for performing a computer-implemented molding simulation method according to the computer instructions. In some embodiments, the processing module 510 reads software algorithms from the other input device 590 or the storage device 550, executes the calculation steps, and stores the calculated result in the RAM 540.

Figure 3:
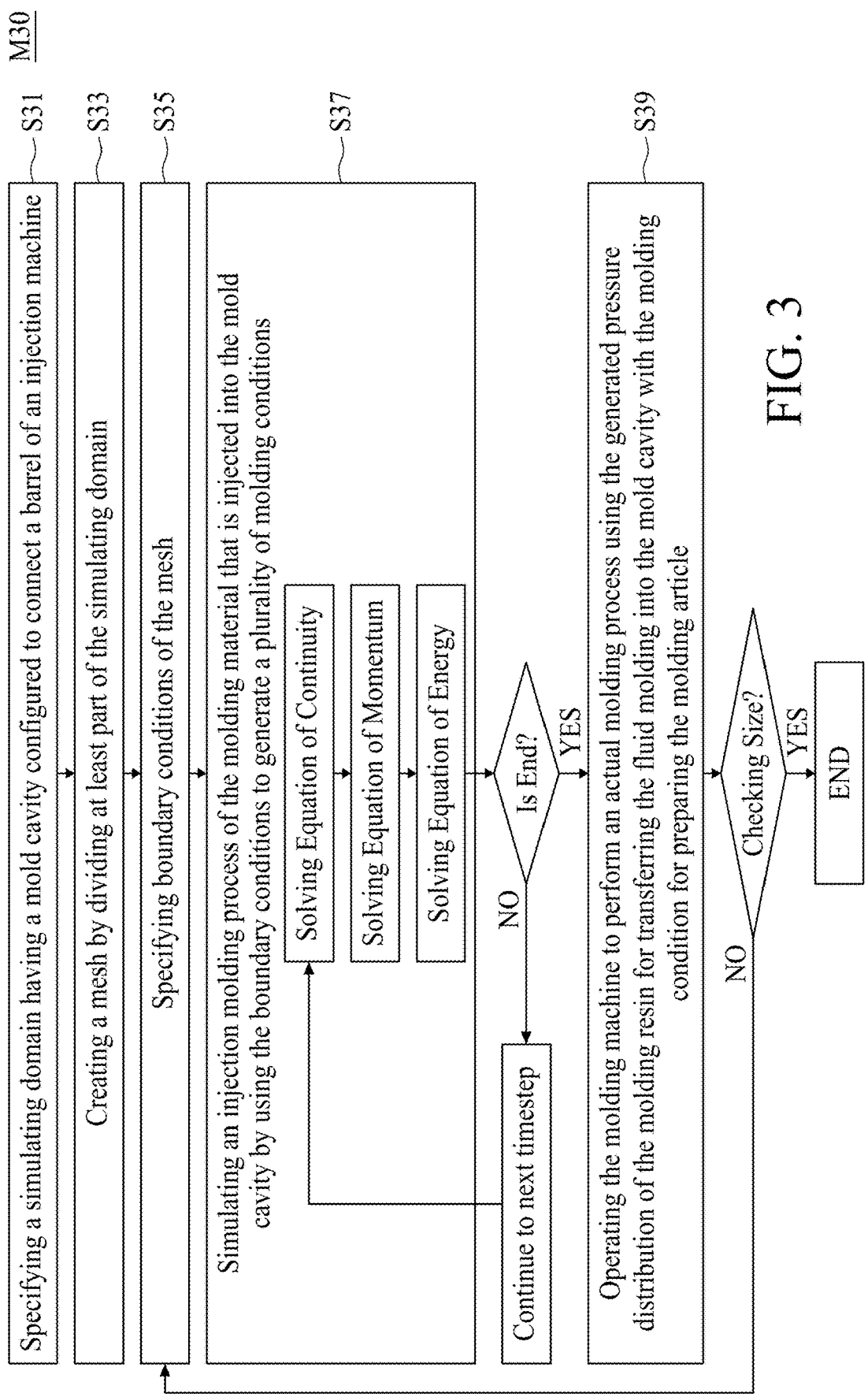
FIG. 3 is a flow chart illustrating an molding simulation method in accordance with some embodiments of the present disclosure.

FIG. 3 is a flow chart illustrating a molding simulation method M30 in accordance with some embodiments of the present disclosure. In some embodiments, the main steps of the molding simulation method M30 comprise a step S31 of specifying a simulating domain having a mold cavity configured to connect a barrel of an molding machine, a step S33 of creating a mesh by dividing at least part of the simulating domain, a step S35 of specifying boundary conditions of the mesh by taking into consideration the at least one flow parameter of the molding material, a step S37 of simulating an molding process of the molding material that is transferring into the mold cavity by using the boundary conditions to generate a plurality of molding conditions, and a step S39 of operating the molding machine for transferring the fluid molding material into the mold cavity with the molding condition using the generated pressure distribution of the molding resin to perform an actual molding process for preparing the molding article.

The following describes an exemplary process flow of the molding simulation method M30 in accordance with various embodiments of the present disclosure.

Figure 4:
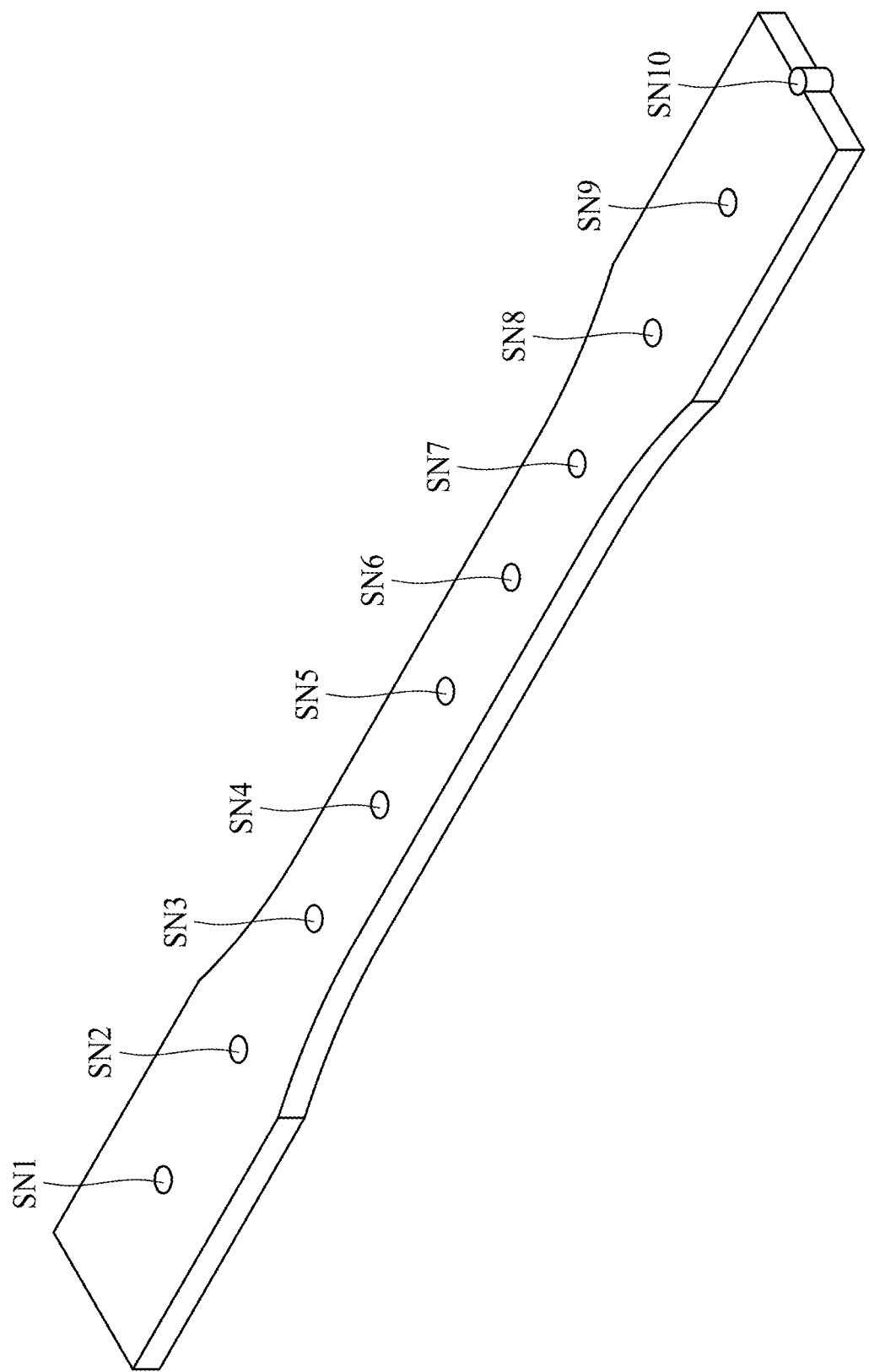
FIG. 4 is a schematic view of a simulating domain in accordance with various embodiments of the present disclosure.

FIG. 4 is a schematic view of a simulating domain 200 in accordance with various embodiments of the present disclosure. In some embodiments, the molding simulation method M30 can begin in step S31 where the simulating domain 200 having the mold cavity 25 is specified. In some embodiments, the simulating domain 200, which is obtained from a CAD (Computer Aided Design) model used in design and development of a product, includes two plates 201 corresponding to the mold cavity 25, a tapered part 203 corresponding to the sprue 21, and two curved parts 205 corresponding to the runners 23 of the mold 20.

Figure 5:
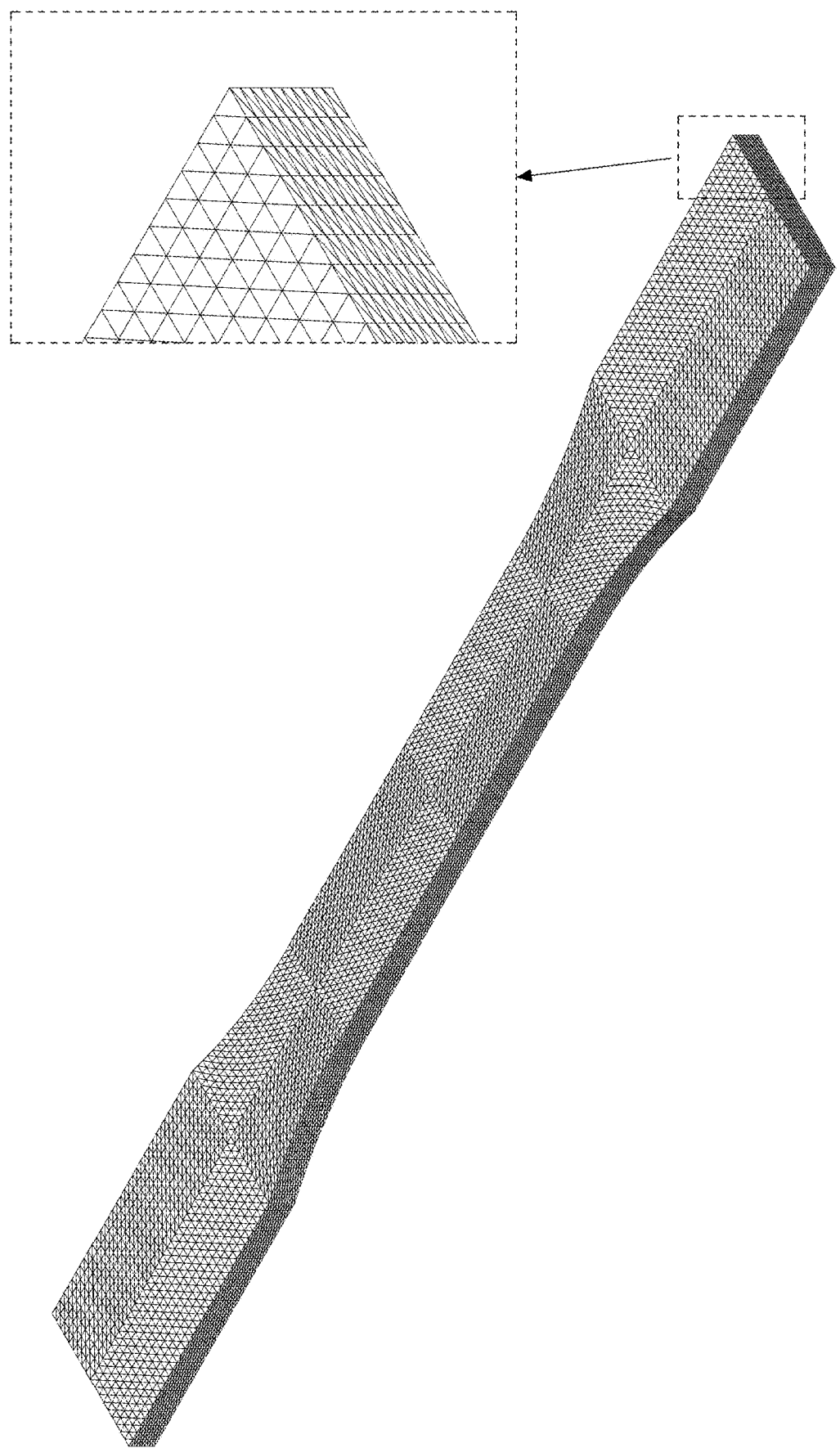
FIG. 5 is a schematic view of a mesh for the simulation domain in accordance with various embodiments of the present disclosure.

FIG. 5 is a schematic view of a mesh 210 for the simulation domain 200 is FIG. 4 in accordance with various embodiments of the present disclosure. In step S33, the mesh 210 is created by dividing at least part of the simulating domain 200 before actually applying numerical analysis, such as an FEM (finite element method), an FDM (finite difference method) or an FVM (finite volume method), to the simulating domain 200. The creation of the mesh 210 is a technique of modeling an object or fluid region (i.e., the simulating domain 200 of the present embodiment) to be analyzed with a set of elements 211, such as rectangular mesh, hexahedral mesh or tetrahedral mesh, in order to perform the subsequent numerical analysis. In step S35, boundary conditions of the mesh are specified.

In some embodiments, in molding simulation operations, the governing equations of fluid mechanics that describe the transient flow behaviors are as follows:

$$\frac{\partial \rho}{\partial t} + \nabla \cdot \rho u = 0 \tag{1}$$

$$\frac{\partial}{\partial t}(\rho u) + \nabla \cdot (\rho u u) = -\nabla p + \nabla \cdot \tau + \rho g \tag{2}$$

$$\rho C_P \left( \frac{\partial T}{\partial t} + u \cdot \nabla T \right) = \nabla \cdot (k \nabla T) + \alpha T \frac{Dp}{Dt} + (\tau : \nabla u) \tag{3}$$

where ρ represents the density; u represents the velocity vector; t represents the time;

$$\tau = \left( \mu_d - \frac{2}{3} \eta \right)(\nabla \cdot u)I + \eta(\nabla u + \nabla u^T)$$

represents the extra stress tensor of a Newtonian fluid; ∇u represents the velocity gradient tensor; g represents the acceleration vector of gravity; p represents the pressure; $C_P$ represents the specific heat; T represents the temperature; k represents the thermal conductivity; η represents the shear viscosity; α represents isobaric expansion coefficient; and (τ:∇u) represents the viscous dissipation.

In some embodiments, the mechanical pressure of the molding resin is defined as follows:

$$p_m = \sigma \quad (4)$$
$$= -\frac{1}{3}(\sigma_{xx} + \sigma_{yy} + \sigma_{zz})$$
$$= p - \mu_d(\nabla \cdot u)$$

Then, based on equation (4), the equations (1) and (2) are further modified as follows:

$$\nabla \cdot \rho u = -\frac{\partial \rho}{\partial t} \quad (5)$$
$$= -\left(\frac{\partial \rho}{\partial T}\right)_p \frac{\partial T}{\partial t} - \left(\frac{\partial \rho}{\partial p}\right)_T \frac{\partial p}{\partial t}$$
$$= -\left(\frac{\partial \rho}{\partial T}\right)_p \frac{\partial T}{\partial t} - \left(\frac{\partial \rho}{\partial p}\right)_T \frac{\partial}{\partial t}(\sigma + \mu_d(\nabla \cdot u))$$

$$\rho \frac{Du}{Dt} = -\nabla \sigma + \nabla \cdot \left(-\frac{2}{3}\eta(\nabla \cdot u)\right) + \nabla \cdot (\eta(\nabla u + \nabla u^T)) \quad (6)$$

where ρ represents the density of the molding resin; u represents the velocity vector; t represents the time; η represents the viscosity of the molding resin, represents the bulk viscosity, ∇·u represents the volume variation of the molding resin, and $\mu_d(\nabla \cdot u)$ represents the pressure difference between the mechanical pressure and the equilibrium pressure of the molding resin.

Solving the governing equations (3), and (5)-(6) requires a transient state analysis, which can be performed numerically using a computer (See, for example, Rong-Yeu Chang and Wen-hsien Yang, "Numerical simulation of mold filling in injection molding using a three-dimensional finite volume approach," International Journal for Numerical Methods in Fluids Volume 37, Issue 2, pages 125-148, Sep. 30, 2001; the entirety of the above-mentioned publication is hereby incorporated by reference herein and made a part of this specification). During the transient state analysis, the process variables that change with time are not zero; i.e., the partial derivatives $$\left(\frac{\partial}{\partial t}\right)$$

in the governing equations governing equations (3), and (5)-(6) are not considered zero.

In some embodiments, the mechanical pressure of the molding resin is defined as follows:

$$\sigma = p - \left(\mu_d - \frac{2}{3}\eta\right)(\nabla \cdot u) \quad (7)$$

Then, based on equation (7), the equations (1) and (2) are further modified as follows:

$$\rho \frac{Du}{Dt} = -\nabla \sigma + \nabla \cdot (\eta(\nabla u + \nabla u^T)) \quad (8)$$

$$\nabla \cdot \rho u = -\frac{\partial \rho}{\partial t} \quad (9)$$
$$= -\left(\frac{\partial \rho}{\partial T}\right)_p \frac{\partial T}{\partial t} - \left(\frac{\partial \rho}{\partial p}\right)_T \frac{\partial}{\partial t}\left(\sigma + \left(\mu_d - \frac{2}{3}\eta\right)(\nabla \cdot u)\right)$$

In some embodiments, the bulk viscosity of the molding resin is represented using an expression:

$$\mu_d = \frac{\mu_0}{1 + \left(\frac{\mu_0(|\nabla \cdot u|)}{\tau^*}\right)^{1-n}} \quad (10)$$

$$\mu_0 = D_1 a^*$$

$$a^* = \begin{cases} \exp\left(\frac{-A_1(T-T^*)}{A_2 + (T-T^*)}\right), & \text{for } T \geq T^* \\ \exp\left(\frac{\Delta H_T}{R}\left(\frac{1}{T} - \frac{1}{T^*}\right)\right), & \text{for } T < T^* \end{cases}$$

$$T^* = D_2 + D_3 \sigma$$

$$A_2 = \tilde{A}_2 + D_3 \sigma$$

where u represents a velocity of the molding resin, $\mu_d$ represents the bulk viscosity, σ represents the mechanical pressure of the molding resin, T* represents a solidifying temperature of the molding resin, ∇·u represents a rate of volume change, $\mu_0$ represents a bulk viscosity at a zero rate of volume change, and τ* represents a characteristic stress related to the volumetric stress at a transition between a first flowing state (Newtonian flowing behavior) and a second flowing state (Power-law flowing behavior) of the molding resin, n represents a power-law index of the first flowing state of the molding resin, and a* represents a time-temperature shift factor including mechanical pressure effect.

The true 3D Finite Volume Method (FVM) is employed due to its robustness and efficiency to solve the transient flow fields in a complex 3D geometrical article. In some embodiments of the present disclosure, the simulation flow in FIG. 4 can be implemented using commercial molding simulation software, Moldex3D (CoreTech System Co. of Taiwan), to facilitate the orientation predictions of the molding resin.

Figure 6:
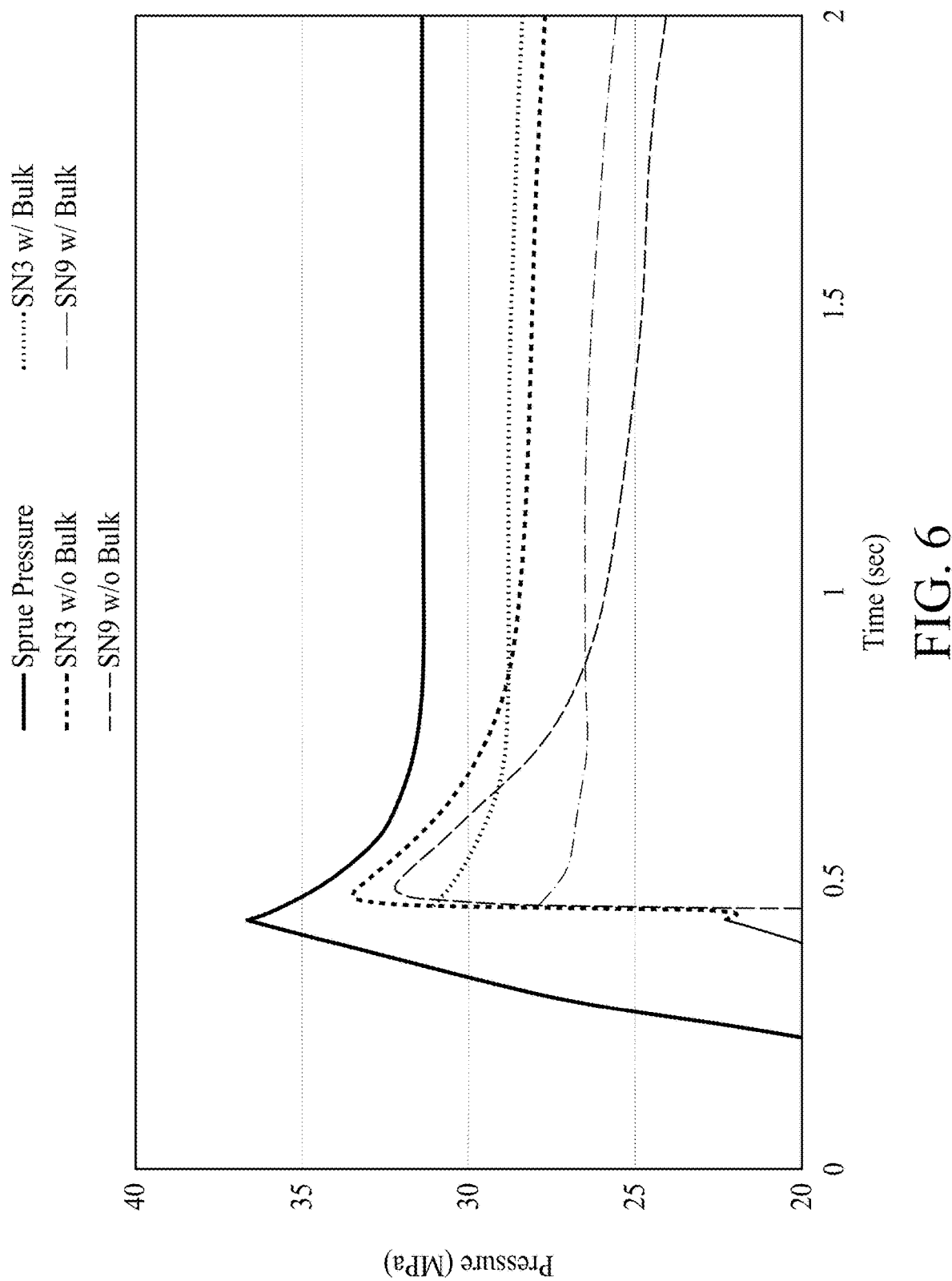
FIG. 6 is a chart showing a pressure distribution of the molding resin at sprue and different sensing nodes (SN3 and SN9) of the simulation domain in the mold cavity based on a molding condition for the molding machine.

FIG. 6 is a chart showing a pressure distribution of the molding resin at sprue and different sensing nodes (SN3 and SN9) of the simulation domain 200 in the mold cavity based on a molding condition for the molding machine, wherein the mechanical pressure distribution of the molding resin is generated based in part on a bulk viscosity effect of the molding resin. In some embodiments, a typical injection molding procedure comprises a filling phase and a packing phase following the filling phase, and the transition node (e.g., the beginning of the packing phase right after the filling phase) is set at 0.5 second in the present embodiment. In the present embodiments, the processing module generates the mechanical pressure distributions of the molding resin in the mold cavity based on the molding condition for the molding machine, wherein the mechanical pressure distributions of the molding resin at different sensing nodes of the simulation domain in the mold cavity are generated with considering and without considering the bulk viscosity effect of the molding resin. As clearly shown in FIG. 6, the bulk viscosity effect generates the mechanical pressure distribution of the molding resin.

Figure 7:
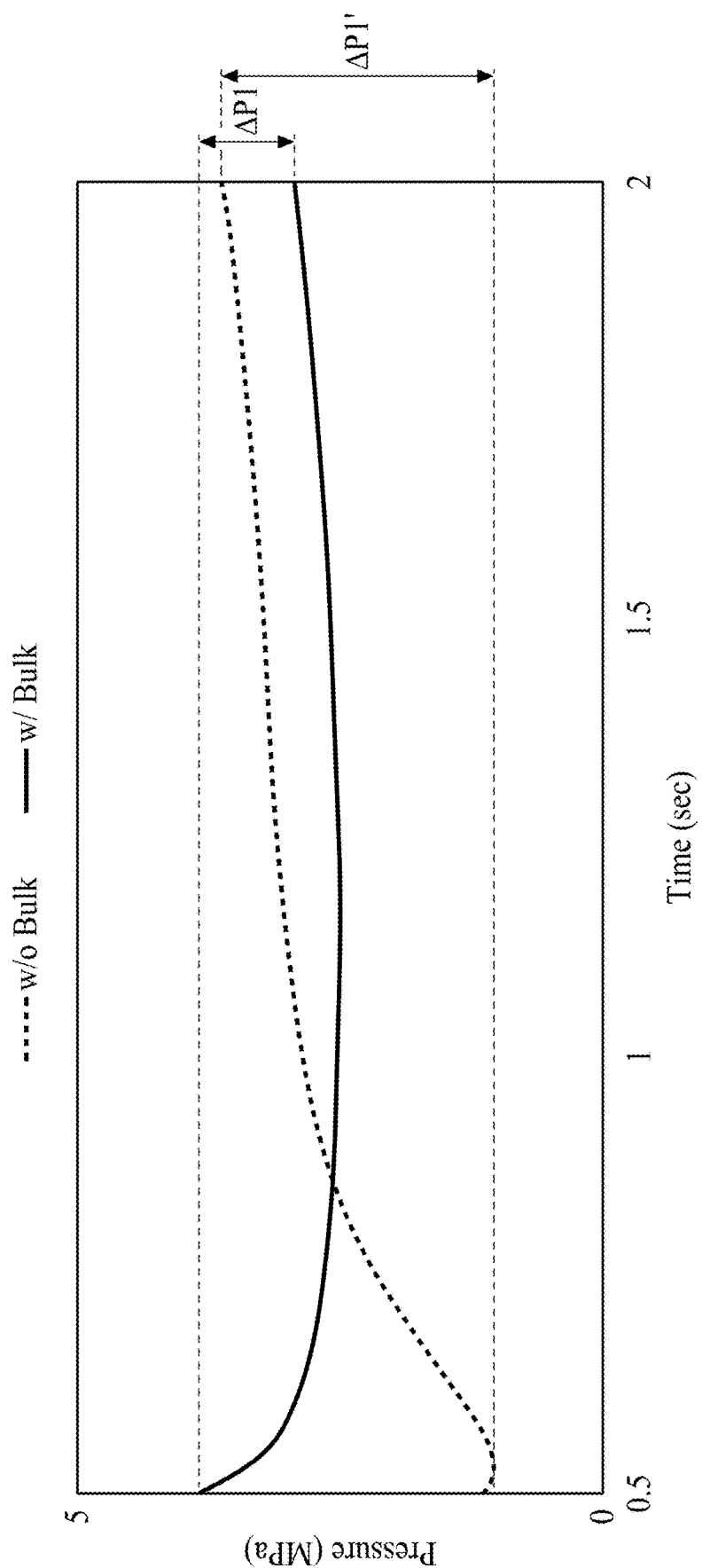
FIG. 7 is a chart showing variations of the pressure differences of the molding resin between the sprue and the sensing node #3, with bulk viscosity effect and without the bulk viscosity effect respectively in the mold cavity based on a molding condition for the molding machine, in accordance with various embodiments of the present disclosure.

FIG. 7 is a chart showing variations of the pressure differences of the molding resin between the sprue and the sensing node #3, with bulk viscosity effect and without the bulk viscosity effect respectively in the mold cavity based on a molding condition for the molding machine, in accordance with various embodiments of the present disclosure. As clearly shown in FIG. 7, the pressure difference ($\Delta P1$) with bulk viscosity effect during the packing phase of the molding process is smaller than the pressure difference ($\Delta P1'$) without bulk viscosity effect'.

Figure 8:
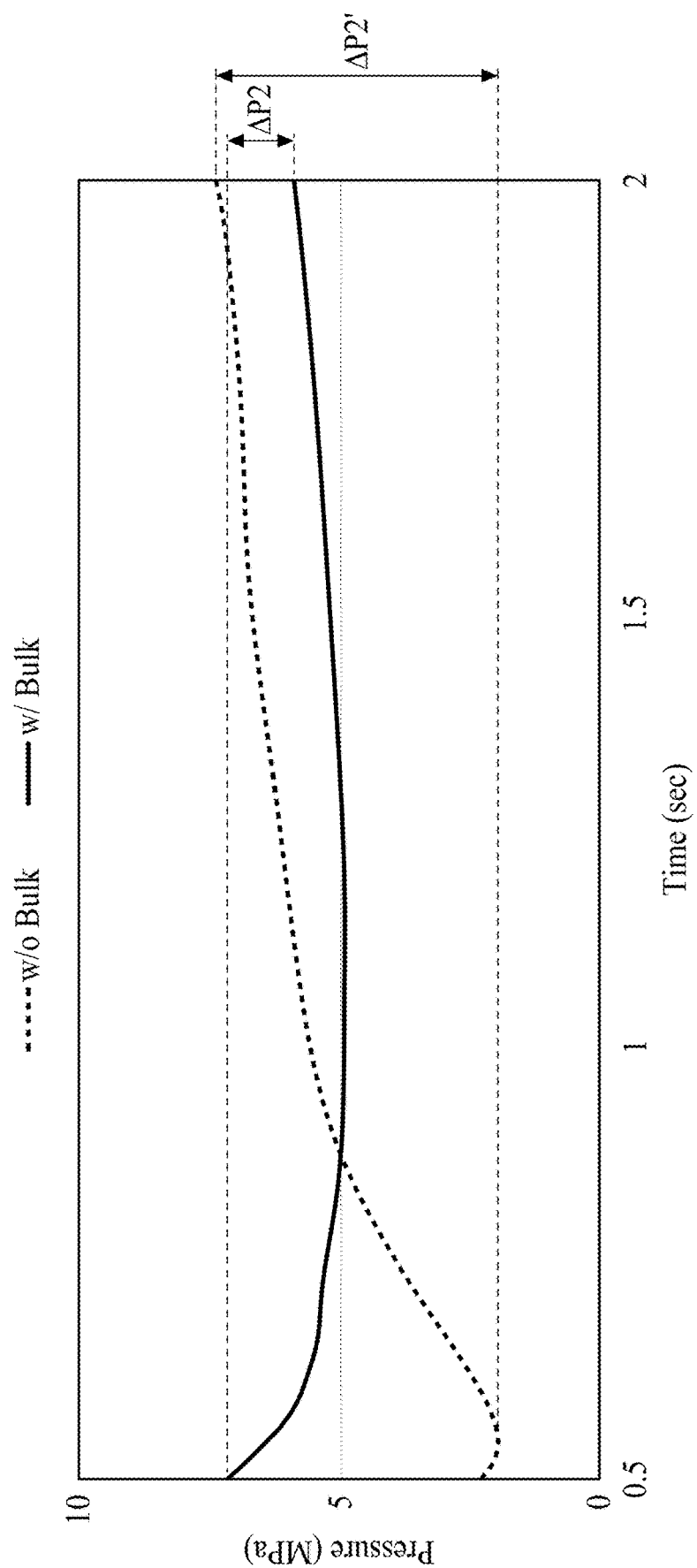
FIG. 8 is a chart showing variations of the pressure difference of the molding resin between the sprue and the sensing node #9, with bulk viscosity effect and without the bulk viscosity effect respectively in the mold cavity based on a molding condition for the molding machine, in accordance with various embodiments of the present disclosure.

FIG. 8 is a chart showing variations of the pressure difference of the molding resin between the sprue and the sensing node #9, with bulk viscosity effect and without the bulk viscosity effect respectively in the mold cavity based on a molding condition for the molding machine, in accordance with various embodiments of the present disclosure. As clearly shown in FIG. 8, the pressure difference ($\Delta P2$) with bulk viscosity effect during the packing phase of the molding process is smaller than the pressure difference ($\Delta P2'$) without bulk viscosity effect.

Figure 9:
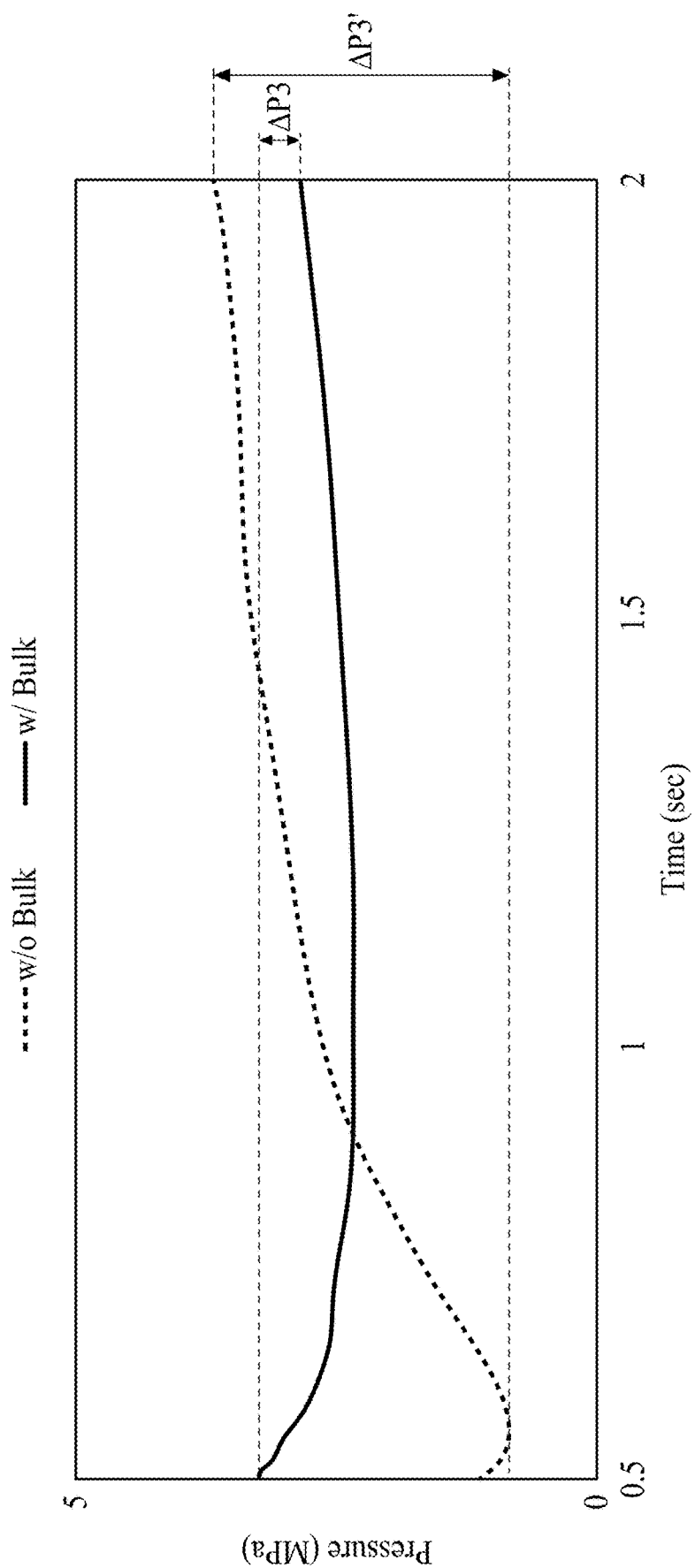
FIG. 9 is a chart showing variations of the pressure difference of the molding resin between the sensing node #3 and the sensing node #9, with bulk viscosity effect and without the bulk viscosity effect respectively in the mold cavity based on a molding condition for the molding machine, in accordance with various embodiments of the present disclosure.

FIG. 9 is a chart showing variations of the pressure difference of the molding resin between the sensing node #3 and the sensing node #9, with bulk viscosity effect and without the bulk viscosity effect respectively in the mold cavity based on a molding condition for the molding machine, in accordance with various embodiments of the present disclosure. As clearly shown in FIG. 9, the pressure difference ($\Delta P3$) with bulk viscosity effect during the packing phase of the molding process is smaller than the pressure difference ($\Delta P3'$) without bulk viscosity effect.

In some embodiments, the simulating step (S37) may be repeated with different boundary conditions to obtain a feasible molding condition (e.g., a screw speed with a flow rate for transferring desired amount of molding material into the mold cavity); then, in the actual molding step (S39), the controller operates the molding machine (control the driving motor 230 to move the screw 220 at a predetermined speed) with the feasible molding condition for transferring the fluid molding material into the mold cavity to perform an actual molding process for preparing the molding article. If the size of the prepared molding article is different from the simulating result, the simulating step (S37) may be further repeated with different boundary conditions to obtain another feasible molding condition (e.g., an updated screw speed with an updated flow rate for transferring desired amount of molding material into the mold cavity) in the subsequent actual molding step (S39).

One aspect of the present disclosure provides a molding system for preparing a molding article. The molding system comprises: a molding machine; a mold disposed on the molding machine and having a mold cavity for being filled with a molding resin; a processing module configured to generate a mechanical pressure distribution of the molding resin in the mold cavity based on a molding condition for the molding machine, wherein the mechanical pressure distribution of the molding resin is generated based in part on a bulk viscosity effect of the molding resin; and a controller operably communicating with the processing module and configured to operate the molding machine for transferring the fluid molding material into the mold cavity with the molding condition using the generated pressure distribution of the molding resin to perform an actual molding process for preparing the molding article.

Another aspect of the present disclosure provides a molding system for preparing a molding article. The molding system comprises: a molding machine; a mold disposed on the molding machine and having a mold cavity for being filled with a molding resin; a processing module configured to generate a pressure difference between a mechanical pressure and an equilibrium pressure of the molding resin in the mold cavity based on a molding condition for the molding machine, wherein the pressure difference of the molding resin is generated based in part on a bulk viscosity effect to a volume variation of the molding resin; and a controller operably communicating with the processing module and configured to operate the molding machine for transferring the fluid molding material into the mold cavity with the molding condition using the generated pressure distribution of the molding resin to perform an actual molding process for preparing the molding article.

In some embodiments, the bulk viscosity effect functions as a resistance preventing the molding resin from changing its size. When the temperature of the molding resin decreases, the molding resin shrinks correspondingly. However, the resistance of the bulk viscosity effect prevents the molding resin from changing its size quickly; consequently, in practice, the molding resin shrinks more slowly due to the bulk viscosity effect. As shown in FIGS. 7-9, the present disclosure can correctly simulate the pressure variation of the molding resin in the mold cavity during the packing phase of the molding process; therefore, the present disclosure can be used to accurately simulate the molding process to generate a molding condition to perform an actual molding process for preparing the molding article with the designed size.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods, and steps.

What is claimed is:

1. A molding system for preparing an molding article, comprising:
    a molding machine;
    a mold disposed on the molding machine and having a mold cavity for being filled with a molding resin;
    a processing module configured to generate a mechanical pressure distribution of the molding resin in the mold cavity based on a molding condition for the molding machine, wherein the mechanical pressure distribution of the molding resin is generated based in part on a bulk viscosity effect of the molding resin; and a controller operably communicating with the processing module and configured to operate the molding machine for transferring the fluid molding material into the mold cavity with the molding condition using the generated pressure distribution of the molding resin to perform an actual molding process for preparing the molding article;

wherein the mechanical pressure distribution of the molding resin is generated based in part on the bulk viscosity effect to a volume variation of the molding resin.

2. The molding system of claim 1, wherein the mechanical pressure distribution of the molding resin to a volume variation of the molding resin is represented using an expression:

$$\rho \frac{Du}{Dt} = -\nabla \sigma + \nabla \cdot \left(\left(-\frac{2}{3}\eta\right)(\nabla \cdot u)\right) + \nabla \cdot (\eta(\nabla u + \nabla u^T))$$

where $\rho$ represents a density of the molding resin, u represents velocity, $\sigma$ represents the mechanical pressure of the molding resin, $\eta$ represents the viscosity of the molding resin, and $\nabla \cdot u$ represents the volume variation of the molding resin.

3. The molding system of claim 2, wherein the mechanical pressure distribution of the molding resin is generated based in part on the bulk viscosity effect to a pressure difference between a mechanical pressure and an equilibrium pressure of the molding resin.

4. The molding system of claim 3, wherein the bulk viscosity effect to a pressure difference between a mechanical pressure and an equilibrium pressure of the molding resin is represented using an expression:

$$\nabla \cdot \rho u = -\frac{\partial \rho}{\partial t} = -\left(\frac{\partial \rho}{\partial T}\right)_P \frac{\partial T}{\partial t} - \left(\frac{\partial \rho}{\partial p}\right)_T \frac{\partial}{\partial t}(\sigma + \mu_d(\nabla \cdot u))$$

where $\rho$ represents a density of the molding resin, u represents a velocity of the molding resin, $\mu_d$ represents the bulk viscosity, $\sigma$ represents the mechanical pressure of the molding resin, and $\mu_d(\nabla \cdot u)$ represents the pressure difference.

5. The molding system of claim 4, wherein the bulk viscosity of the molding resin is represented using an expression:

$$\mu_d = \frac{\mu_0}{1 + \left(\frac{\mu_0(|\nabla \cdot u|)}{\tau^*}\right)^{1-n}}$$

$$\mu_0 = D_1 a^*$$

$$a^* = \begin{cases} \exp\left(\frac{-A_1(T - T^*)}{A_2 + (T - T^*)}\right), \text{ for } T \geq T^* \\ \exp\left(\frac{\Delta H_T}{R}\left(\frac{1}{T} - \frac{1}{T^*}\right)\right), \text{ for } T < T^* \end{cases}$$

$$T^* = D_2 + D_3 \sigma$$

$$A_2 = \tilde{A}_2 + D_3 \sigma$$

where T* represents a solidifying temperature of the molding resin, $\nabla \cdot u$ represents a rate of volume change, $\mu_0$ represents a bulk viscosity at a zero rate of volume change, and $\tau^*$ represents a characteristic stress related to the volumetric stress at a transition between a first flowing state and a second flowing state of the molding resin, n represents a power-law index of the first flowing state of the molding resin, and a* represents a time-temperature shift factor including mechanical pressure effect.

6. The molding system of claim 1, wherein the mechanical pressure distribution of the molding resin to a volume variation of the molding resin is represented using an expression:

$$\rho \frac{Du}{Dt} = -\nabla \sigma + \nabla \cdot (\eta(\nabla u + \nabla u^T))$$

where $\rho$ represents a density of the molding resin, u represents velocity, $\sigma$ represents the mechanical pressure of the molding resin, $\eta$ represents the viscosity of the molding resin, and $\nabla \cdot u$ represents the volume variation of the molding resin.

7. The molding system of claim 6, wherein the bulk viscosity effect to a pressure difference between a mechanical pressure and an equilibrium pressure of the molding resin is represented using an expression:

$$\nabla \cdot \rho u = -\frac{\partial \rho}{\partial t} = -\left(\frac{\partial \rho}{\partial T}\right)_P \frac{\partial T}{\partial t} - \left(\frac{\partial \rho}{\partial p}\right)_T \frac{\partial}{\partial t}\left(\sigma + \mu_d - \frac{2}{3}\eta\right)(\nabla \cdot u)$$

where $\rho$ represents a density of the molding resin, u represents a velocity of the molding resin, $\mu_d$ represents the bulk viscosity, $\sigma$ represents the mechanical pressure of the molding resin, and $$\left(\mu_d - \frac{2}{3}\eta\right)(\nabla \cdot u)$$

represents the pressure difference.

8. The molding system of claim 7, wherein the bulk viscosity of the molding resin is represented using an expression:

$$\mu_d = \frac{\mu_0}{1 + \left(\frac{\mu_0(|\nabla \cdot u|)}{\tau^*}\right)^{1-n}}$$

$$\mu_0 = D_1 a^*$$

$$a^* = \begin{cases} \exp\left(\frac{-A_1(T - T^*)}{A_2 + (T - T^*)}\right), \text{ for } T \geq T^* \\ \exp\left(\frac{\Delta H_T}{R}\left(\frac{1}{T} - \frac{1}{T^*}\right)\right), \text{ for } T < T^* \end{cases}$$

$$T^* = D_2 + D_3 \sigma$$

$$A_2 = \tilde{A}_2 + D_3 \sigma$$

where T* represents a solidifying temperature of the molding resin, $\nabla \cdot u$ represents a rate of volume change, $\mu_0$ represents a bulk viscosity at a zero rate of volume change, and $\tau^*$ represents a characteristic stress related to the volumetric stress at a transition between a first flowing state and a second flowing state of the molding resin, n represents a power-law index of the first flowing state of the molding resin, and a* represents a time-temperature shift factor including mechanical pressure effect.

* * * * *